(12) United States Patent
Maletschek et al.

(10) Patent No.: US 6,367,572 B1
(45) Date of Patent: Apr. 9, 2002

(54) DRIVE ASSISTANCE APPARATUS FOR A VEHICLE HAVING A MAIN TRANSMISSION THAT IS MECHANICAL

(75) Inventors: Karl-Günther Maletschek, Grossostheim (DE); Jean-Marie Rouillard, La Croix Saint-Ouen (FR)

(73) Assignee: Poclain Hydraulics Industrie, Verberie Cedex (FR)

( * ) Notice: Subject to any disclaimer, the term of this patent is extended or adjusted under 35 U.S.C. 154(b) by 0 days.

(21) Appl. No.: 09/415,987

(22) Filed: Oct. 12, 1999

(30) Foreign Application Priority Data

Oct. 12, 1998 (FR) .............................. 98 12728

(51) Int. Cl.[7] .............................................. B60K 17/10
(52) U.S. Cl. ...................... 180/305; 180/243
(58) Field of Search ................... 180/243, 305, 180/307, 308, 242

(56) References Cited

U.S. PATENT DOCUMENTS

| | | | |
|---|---|---|---|
| 3,811,525 A | * | 5/1974 | Stuart ......................... 180/243 |
| 3,902,566 A | | 9/1975 | Bird |
| 3,981,374 A | * | 9/1976 | Johns, Jr. ................... 180/14.3 |
| 4,140,196 A | | 2/1979 | Brewer |
| 5,117,936 A | * | 6/1992 | Nakamura et al. .......... 180/242 |
| 5,682,958 A | | 11/1997 | Kalhorn |

FOREIGN PATENT DOCUMENTS

| | | |
|---|---|---|
| FR | 1425800 | 4/1966 |
| FR | 2426812 | 12/1979 |
| FR | 2504987 | 11/1982 |

* cited by examiner

Primary Examiner—Kevin Hurley
(74) Attorney, Agent, or Firm—Ladas & Parry

(57) ABSTRACT

Apparatus for providing drive assistance in a vehicle having a main transmission that is mechanical. The apparatus comprises a hydraulic motor of the type having radial pistons that is powered by a main pump. The pistons can be retracted into their cylinders in a free-wheel configuration of the motor or they can co-operate with the reaction member of the motor when they are in a working configuration. The apparatus comprises means for implementing successive stages of a sequence for causing the motor to pass from its free-wheel configuration to its working configuration. The sequence comprises an initialization stage in which the case of the motor is filled with fluid at a "service" pressure by means of an auxiliary duct and a service duct, and in which the main feed and exhaust ducts of the motor are placed at a filling pressure that is lower than the service pressure. The sequence then comprises a clutch engagement stage during which the inside space of the case is connected to a fluid return tank and during which the main ducts are isolated from each other.

19 Claims, 5 Drawing Sheets

|     | 28 | 32 | Z1 | Z2 | Z3 |
| --- | --- | --- | --- | --- | --- |
| S0  | 0  | 0  | 0  | 0  | 0  |
| S0' | 0  | 1  | 1  | 0  | 0  |
| SI  | 0  | 1  | 1  | 1  | 0  |
| SE1 | 0  | 1  | 0  | 1  | 0  |
| SE2 | 0  | 1  | 0  | 0  | 1  |
| SE3 | 1  | 1  | 0  | 0  | 1  |
| Acc | 0  | 1  | 1  | 0  | 0  |

FIG.2

|      | 28 | 32 | Z1 | Z2 | Z3 | Z4 |
| ---- | --- | --- | --- | --- | --- | --- |
| S'0  | 0  | 0  | 0  | 0  | 0  | 0  |
| S'0' | 0  | 1  | 1  | 0  | 0  | 0  |
| S'I  | 0  | 1  | 1  | 1  | 0  | 0  |
| S'E1 | 1  | 1  | 1  | 1  | 0  | 0  |
| S'E2 | 1  | 1  | 0  | 0  | 1  | 0  |
| A'cc | 0  | 1  | 1  | 0  | 0  | 1  |

FIG.3

|  | 28 | 32 | Z1 | Z2 | Z3 |
|---|---|---|---|---|---|
| S"0 | 0 | 0 | 0 | 0 | 0 |
| S"0' | 0 | 1 | 1 | 0 | 0 |
| S"I | 0 | 1 | 1 | 1 | 0 |
| S"E1 | 0 | 1 | 0 | 1 | 0 |
| S"E2 | 0 | 1 | 0 | 0 | 1 |
| S"E3 | 1 | 1 | 0 | 0 | 1 |
| S"E4 | 1 | 1 | 0 | 0 | 1 |
| A"cc | 0 | 1 | 1 | 0 | 0 |

FIG.6

DRIVE ASSISTANCE APPARATUS FOR A VEHICLE HAVING A MAIN TRANSMISSION THAT IS MECHANICAL

FIELD OF THE INVENTION

The present invention relates to a drive assistance apparatus for a vehicle having a mechanical main transmission for driving displacement members of the vehicle, the apparatus comprising a main source of fluid under pressure suitable for being driven by first drive means to deliver fluid under pressure, and at least one hydraulic motor suitable for being fed with fluid under pressure by the main source of fluid to drive at least one displacement member of the vehicle, said motor having a stator and a rotor suitable for rotating relative to the stator about an axis of rotation, the motor comprising a cylinder block which belongs to a first one of the two elements constituted by the stator and the rotor, which is disposed inside a case, and which presents a plurality of cylinder-and-piston assemblies disposed radially relative to the axis of rotation, together with a reaction member for the pistons which belongs to the second one of said two elements, the motor also having a main fluid feed duct and a main fluid exhaust duct suitable for being put into communication with the cylinders, and an auxiliary duct connected to an internal space provided inside the case around the cylinder block and suitable for being put into communication with a fluid return tank, the motor being suitable for adopting a "working" configuration in which the pistons co-operate with the reaction member and are suitable for generating outlet torque under the effect of the fluid delivered by the main fluid source, and also a "free-wheel" configuration in which the pistons are maintained in the retracted position inside their cylinders so that the rotor is free to rotate relative to the stator without generating any outlet torque.

BACKGROUND OF THE INVENTION

French patent No. 1 425 800 discloses an assistance hydraulic motor and relates more particularly to maintaining said motor in its free-wheel configuration. It thus proposes using the leak return duct of the motor, which corresponds to the above-mentioned auxiliary duct, to connect it temporarily to a source of fluid under pressure which, by causing a relatively high pressure to exist inside the case, enables the pistons to be urged in such a manner as to cause them to be retracted radially into the cylinder block. That document also states that to pass from the free-wheel configuration to the working configuration, it is necessary to disconnect the leak return duct from said source of fluid under pressure and to connect it to a fluid return tank.

French patents Nos. 2 426 812 and 2 504 987 propose using resilient return springs to hold the pistons in their retracted positions inside their respective cylinders, while the motor is in its free-wheel configuration. For passing to the working configuration, those documents state merely that in operation the cylinders are fed with fluid under pressure, thereby causing the wheels carried at the free ends of the pistons to come into contact with the cam against the resilient return force exerted by the springs.

Conventionally, a vehicle fitted with drive assistance apparatus of the above-specified type is normally driven solely by the first drive means, e.g. the wheels of a first axle themselves driven by a main transmission that is mechanical. It is only when the travel conditions of the vehicle require additional drive force over and above that provided by the mechanical main transmission (e.g. going uphill) or additional braking force (e.g. going downhill) that the assistance hydraulic motor is used. This can apply, for example, under difficult conditions, e.g. on a worksite or on slippery ground. Conventionally, the assistance hydraulic motor is designed to drive other vehicle drive members, for example the wheels on a second axle.

With existing apparatuses, starting from a situation in which the vehicle is driven solely by the mechanical main transmission, it is necessary to slow the vehicle down considerably, or even to stop it completely, prior to causing the assistance hydraulic motor to change over from its free-wheel configuration to its working configuration.

When the vehicle is being driven solely by its mechanical main transmission, the drive members that are coupled to the assistance hydraulic motor cause the rotor of said motor to rotate, which motor is then in its free-wheel configuration. When the pistons are caused to move out from their cylinders so as to place their free ends (possibly fitted with wheels) in contact with the cam, this contact takes place suddenly, giving rise to shocks between the pistons and the cam, which runs the risk of prematurely damaging the cam and the free ends of the pistons (the wheels), and also to successive banging noises which are disagreeable and which give the driver of the vehicle the impression that the equipment is of poor quality.

OBJECTS AND SUMMARY OF THE INVENTION

The present invention seeks to propose an apparatus to which changeover from the free-wheel configuration to the working configuration takes place under better conditions, thus making it possible to perform said changeover while the vehicle is traveling at a relatively high speed and while avoiding or greatly limiting any risk of premature wear of motor components and/or disagreeable banging noises.

This object is achieved by the fact that the apparatus comprises means for performing the successive stages of a sequence for causing the motor to pass from its free-wheel configuration into its working configuration, said sequence comprising an initialization stage in which the auxiliary duct is isolated from the fluid return tank and is connected to a "service" duct which is fed with fluid under pressure such that a "service" fluid pressure exists inside the internal space of the case, and in which the main feed and exhaust ducts are placed at a common "filling" pressure which is less than the service pressure but greater than the pressure of the fluid return tank, the sequence further comprising, after the initialization stage, a clutch engagement stage during which the auxiliary duct is put into communication with the fluid return tank and during which the main feed and exhaust ducts are isolated from each other.

In the free-wheel configuration, the pistons can be held retracted inside the cylinders either by fluid pressure inside the case, or by return means such as resilient springs.

In the first case, the piston deactivation pressure can be equal to or substantially equal to the service pressure and it can be obtained by the leak return duct being connected to the service pressure source. In the free-wheel configuration, the main feed and exhaust ducts are conventionally connected to the fluid return duct.

Thus, in this first case, when it is decided to change over from the free-wheel configuration to the working configuration, the first condition for obtaining the initialization stage, i.e. obtaining the service pressure inside the case, is already acquired, and the initialization stage is implemented by placing the main feed and exhaust ducts at the filling pressure which is higher than the pressure of the fluid return tank.

When resilient return means such as springs are used for deactivating the pistons, the main ducts and the fluid return ducts are normally connected to the fluid return tank in the free-wheel configuration. Consequently, when it is decided to pass from said configuration to the working configuration, it is necessary firstly to connect the leak return duct to the service duct so as to cause the service pressure to exist therein, and secondly to place the main feed and exhaust ducts at the filling pressure.

Such resilient return means enable the hydraulic motor to be deactivated without requiring deactivation pressure to be permanently maintained in the circuit.

In any event, at the end of the initialization stage, the main feed and exhaust ducts are at the filling pressure while the space inside the case is at the service pressure which is slightly higher than the filling pressure. In this situation, when the auxiliary duct is put into communication with the fluid return tank during the clutch engagement stage, the pressure inside the case is caused to drop so that the common pressure in the main ducts quickly becomes greater than said pressure inside the case, thus causing the pistons to be extended simultaneously from their cylinders so that all of them make contact with the cam at the same time. The banging noises are avoided because the fluid pressure inside the case is reduced progressively, even though it is reduced quickly.

During the clutch engagement stage, the main feed and exhaust ducts can be isolated from each other at the same time as the auxiliary duct is put into communication with the fluid return tank, or slightly after said operation.

Generally, even when the main feed and exhaust ducts are isolated from each other, the pressure in the main exhaust duct is greater than the pressure of the fluid return tank since some minimum booster pressure is usually maintained in the feed and exhaust ducts. Thus, even though the main exhaust duct is placed at "low" pressure compared with the feed pressure, said "low" pressure is greater than the pressure of the fluid return tank (close to atmospheric pressure), such that even those pistons which are connected to the main exhaust duct tend to move out from their cylinders during the clutch engagement stage.

In an advantageous embodiment, during the clutch engagement stage, the main ducts are isolated from each other only after the auxiliary duct has been put into communication with the fluid return tank.

This guarantees that the free ends of the pistons (optionally fitted with wheels) are put quickly into contact with the cam, the speed at which the pistons are extended being substantially the same, regardless of whether the pistons are connected to the feed duct or to the exhaust duct.

In which case, in a first variant, the clutch engagement stage comprises a first step during which the auxiliary duct is put into communication with the fluid return tank while the main ducts remain at the filling pressure, followed by a second step during which said main ducts are isolated from each other while the first drive means are inactive, and by a third step during which said first drive means are activated so as to drive the main source of fluid under pressure.

In this first variant, the clutch engagement stage is performed in three successive steps. In particular, the main source of fluid under pressure is not put into operation until all of the pistons are already in contact with the cam. Thus, during the second step of the clutch engagement stage, the rotor of the motor is driven by the wheel(s) to which it is coupled, the piston being in contact with the cam, thereby giving rise to a difference in pressure between the main feed and exhaust ducts which are isolated from each other.

By subsequently activating the main source of fluid under pressure during the third step of the clutch engagement stage, it is possible to increase said pressure difference progressively and to enable the hydraulic motor to perform its role of providing assistance. In other words, during the second step of the clutch engagement stage, it is the vehicle drive members coupled to the hydraulic motor which act as a "motor" while the hydraulic motor is operating as a pump.

In a second variant, the clutch engagement stage comprises a first step during which the first drive means are activated so as to drive the main source of fluid under pressure while the auxiliary duct remains isolated from the fluid return tank, followed by a second step during which the auxiliary duct is put into communication with the fluid return tank and during which the main ducts are isolated from each other.

In this second variant, the main source of fluid under pressure is put into operation first, prior to causing the pistons to be extended from their cylinders so as to come into contact with the cam. As soon as the main feed and exhaust ducts have been isolated from each other and connected to the main source of fluid under pressure, a significant pressure difference is obtained between the ducts of the cylinders connected to the main ducts (at least those connected to the main feed ducts) and the inside space of the case which is put at the pressure of the fluid return tank, thereby accelerating the displacement of the pistons in the direction for bringing them into contact with the cam.

In addition, this makes it possible to ensure that the main source of fluid under pressure is engaged with its drive motor (in general the engine of the main transmission) under conditions in which the main feed and exhaust ducts are still connected together, which means that said source of fluid under pressure does not apply any torque for the hydraulic motor or is not subjected to any braking torque therefrom. This makes it possible for the clutch to be simpler and less expensive than is necessary for a situation in which torque is already present when clutch engagement takes place.

In another embodiment, the clutch engagement stage comprises a first step during which the first drive means are activated so as to drive the main source of fluid under pressure while the auxiliary duct remains isolated from the fluid return tank, followed by an intermediate step during which the main ducts are momentarily isolated from each other, and then momentarily reconnected to each other, and by a final step during which the auxiliary duct is put into communication with the fluid return tank and during which the main ducts are isolated from each other.

The intermediate step of the clutch engagement stage follows activation of the mechanical drive means for the pump. By momentarily isolating the main ducts before the auxiliary duct is put into communication with the fluid return duct, and then putting the main ducts back into communication with each other, this step makes it possible to reduce the stresses to which the mechanical drive means of the pump used for feeding the motor are subjected during clutch engagement, and to avoid excess pressures in the main ducts. After this intermediate step, as in the preceding embodiment and its variants, there is a final step of the clutch engagement stage during which the auxiliary duct is put into communication with the fluid return tank and during which the main ducts are isolated from each other for a long duration.

Advantageously, in accordance with the invention, the means for performing the successive stages of the sequence for causing the motor to pass from its free-wheel configuration to its working configuration comprise valves controlled by command means themselves under the control of a control unit.

This control unit controls passage through the various stages of the sequence and the various steps of the phases. It can be constituted by dedicated electronic circuits, but it is advantageously implemented in the form of a control unit such as a processor, a microprocessor or a microcontroller. It then serves not only to control passage through the various stages of the sequence, but also to control the durations of said stages and the steps therein.

Under such circumstances, the means for controlling the valves are advantageously pneumatic control means.

A source of pneumatic pressure is generally installed on a vehicle that is fitted with apparatus of the invention for the purpose of providing the vehicle with braking. Conventionally, the compressed air pressure is used for releasing brakes which are otherwise held on in the absence of compressed air. The use of pneumatic means thus makes it possible to take advantage of a source of air under pressure that is already in existence on the vehicle. Furthermore, when the vehicle is moving, compressed air is put under pressure so as to release the brakes of the vehicle, so air under pressure is naturally available to keep the controlled valves in the desired positions, without loss of energy, even when the assistance hydraulic motor is in its free-wheel configuration.

BRIEF DESCRIPTION OF THE DRAWINGS

The invention will be better understood and its advantages will appear more clearly on reading the following detailed description of an embodiment given by way of non-limiting example. The description refers to the accompanying drawings, in which:

FIGS. 2 and 3 are truth tables showing the sequences for passing from the free-wheel configuration to the working configuration respectively in the first and second variants described above;

FIG. 6 is a truth table showing the sequence for the FIG. 5 circuit.

MORE DETAILED DESCRIPTION

Figure 1:
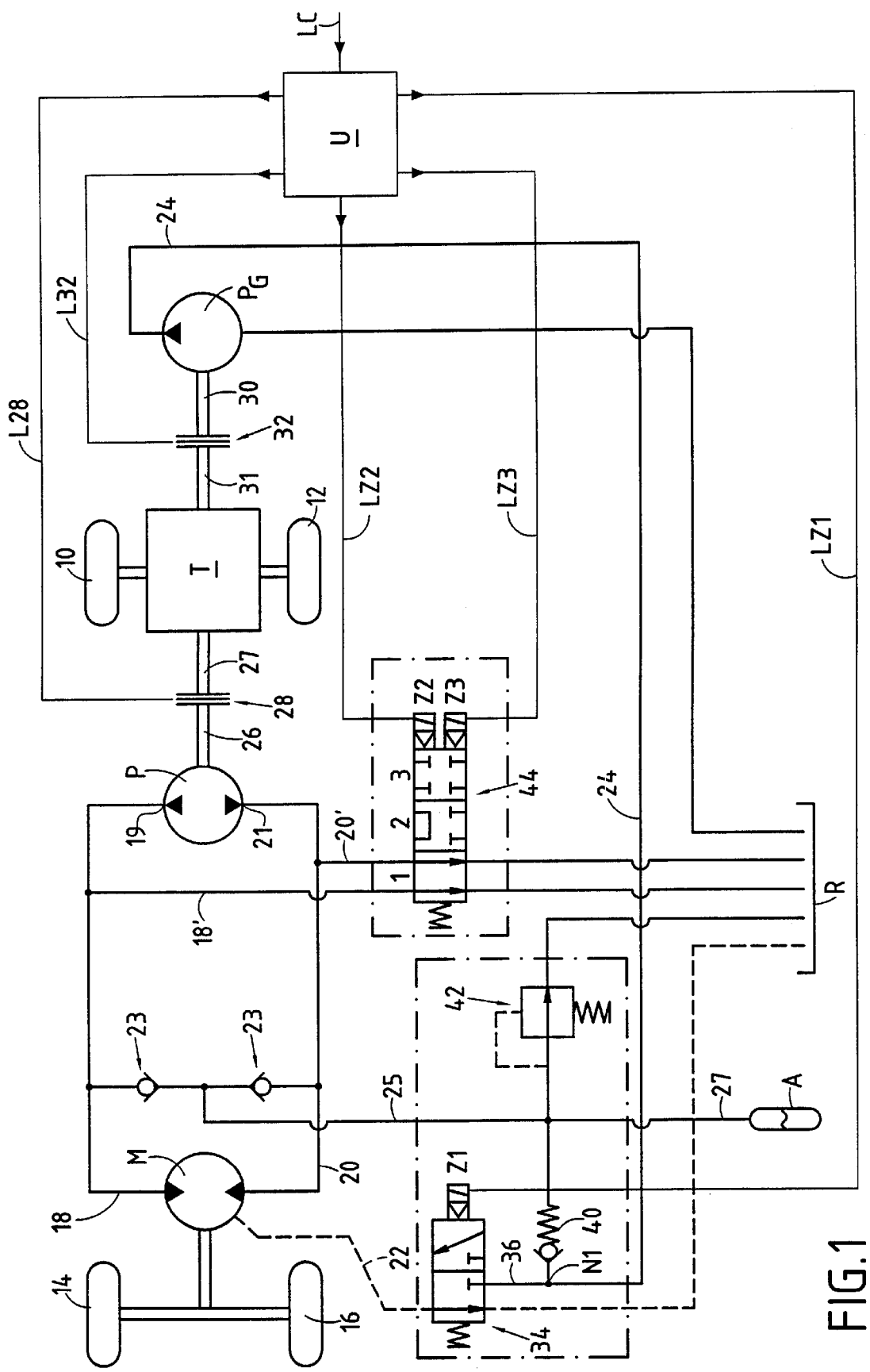
FIG. 1 is a diagram of the various elements of a hydraulic circuit comprising apparatus of the invention, together with its control means.

The circuit shown in FIG. 1 comprises a transmission T having coupled thereto the wheels 10 and 12 of a first axle of a vehicle. The transmission T is the main mechanical transmission of the vehicle and it is used for propelling the vehicle under normal conditions, for example on the road.

FIG. 1 also shows a hydraulic motor M having coupled thereto the wheels 14 and 16 of a second axle of the vehicle. The motor M is an assistance hydraulic motor and it is used to assist the transmission T, i.e. to exert an additional drive force on the wheels 14 and 16 of the second axle while the wheels 10 and 12 continue to be driven by the transmission T.

In conventional manner, the motor M is a hydraulic motor having radial pistons, comprising a stator and a rotor. It can be a motor having a rotary case, in which case the rotor comprises the case and the cam of the motor, while the stator comprises its cylinder block, or else it can be a motor having a rotary shaft, in which case the cylinder block and the outlet shaft associated therewith form the rotor, while the case and the cam belong to the stator. By way of example, it can be a motor of the type disclosed in French patent No. 2 504 987.

The hydraulic circuit comprises a main pump P which, in the example shown, is a reversible pump of fixed cylinder capacity. The hydraulic motor M is connected to the pump P via main ducts 18 and 20 which are respectively connected to main outlets 19 and 21 of the pump P and which, depending on the direction of rotation thereof, serve respectively as a feed and as an exhaust for the motor. In conventional manner, the motor also has an auxiliary duct 22 suitable for being connected to a fluid return tank R to serve as a leak return duct.

In the example shown, there is only one motor M for driving the two wheels 14 and 16 of the second axle of the vehicle. Naturally, it is possible to use a larger number of assistance hydraulic motors, e.g. one motor for each wheel of the second axle, in which case the various motors used are respectively connected in parallel by main feed and exhaust ducts to the main outlets 19 and 21 of the pump P.

The circuit also has a booster pump $P_G$ which feeds a booster duct 24, itself connected to the main ducts 18 and 20 by a booster line comprising a booster connection duct 25 and check valves 23 which allow fluid to flow only in the direction for boosting the ducts 18 and 20.

When the booster pump is in operation and when the ducts 18 and 20 are isolated from the tank R, these ducts are maintained at a pressure that is not less than the boost pressure, and that is higher than the pressure of the fluid return tank. Conventionally, this tank is at atmospheric pressure or at a pressure close thereto, while the pressure delivered by the booster pump is about 20 bars.

The pumps P and $P_G$ are connected to drive means which enable them to be driven so that they generate fluid flow. Conventionally, such drive means comprise a drive shaft and an auxiliary motor, in general an internal combustion engine. In the example shown, advantage is taken of the engine of the main transmission T for driving the pumps P and $P_G$. The pump P is coupled to a drive shaft 26, itself suitable for coupling to an outlet shaft 27 of the transmission T via a clutch system 28. Similarly, the pump $P_G$ is coupled to the drive shaft 30, itself suitable for being coupled to an outlet shaft 31 of the main transmission T via another clutch system 32.

The circuit also has a first selector valve 34 placed on the leak return duct and which, in its first position as shown in FIG. 1, connects the auxiliary duct 22 to the fluid return tank R while isolating said auxiliary duct from a service duct 36, and which in its second position connects the auxiliary duct 22 to the service duct 36 while isolating said auxiliary duct 22 from the tank R. The circuit has a service duct 36 which is permanently connected to the booster duct 24 at a node N1. Downstream from the node N1 in the fluid flow direction, the booster connection duct 25 has a rated check valve 40. The booster duct also has means for limiting the pressure in the booster line, comprising a pressure limiter valve 42.

There is also shown a tank A for accumulating fluid under pressure, for a function that is described below.

The circuit also has a three-position second selector valve 44 placed on ducts 18' and 20' which are respectively connected to the ducts 18 and 20. In its first position, as shown in FIG. 1, and marked by the digit 1, this valve 44 connects the two main ducts 18 and 20 to the fluid return tank R. In its second position, marked by the digit 2, it makes the two main ducts 18 and 20 communicate with each other while isolating the main ducts from the fluid return tank. Finally, in its third position, marked by the digit 3, it isolates the main ducts 18 and 20 from each other and also isolates them from the fluid return tank R.

The diagram of FIG. 1 also shows a control unit U which serves to control passage through the various successive stages of the sequence. In particular, the control unit U serves to control the control means of the above-described controlled valves 33 and 44. The valve 34 is moved between its first and second positions by control means Z1, while the valve 44 is moved into its position 2 by control means Z2 and into its position 3 by control means Z3.

FIGS. 2 and 3 are truth tables making it easier to understand first and second variants of the sequence in accordance with the invention. These tables specify the various members which are activated to implement the sequences.

They comprise the clutch 28 which enables the pump P to be driven, the clutch 32 which enables the pump $P_G$ to be driven, and the pneumatic commands Z1, Z2, and Z3 which control the valves 34 and 44. The state in which one of the above-specified elements is "off" is indicated by the digit 0, while the state in which said element is "on" is indicated by the digit 1.

It is also considered that when the pneumatic control Z1 is not on, the valve 34 occupies its first position as shown in FIG. 1, and that it occupies its second position when the command Z1 is on.

It is also considered that the valve 44 occupies its position 1 when both Z2 and Z3 are at 0, whereas it occupies its position 2 when Z2 is at 1 while Z3 is at 0, and that it occupies its position 3 when Z3 is at 1 while Z2 is at 0.

The above-specified convention is to make the truth tables of FIGS. 2 and 3 easier to understand. Nevertheless, it need not correspond exactly to reality when controlling the various commands. Thus, on certain types of three-position valve for the valve 44, it can be appropriate to keep Z2 on when turning on Z3.

In these figures, each horizontal row represents the various states occupied by the apparatus between the assistance hydraulic motor being in its free-wheel configuration and in its working configuration.

The first variant is described initially with reference to FIG. 2. If the means selected for deactivating the pistons of the motor by retracting them into their respective cylinders are mechanical means such as resilient return springs, then the free-wheel configuration of the motor corresponds to state S0 in which all of the elements 28, 32, Z1, Z2, and Z3 are at 0. However, if the pistons are kept retracted inside the cylinders under the effect of fluid pressure existing inside the case, then the free-wheel configuration corresponds to state S0' in which the leak return duct 22 is used to maintain sufficiently high fluid pressure inside the case, around the pistons. Under such circumstances, it is naturally preferable to use the service duct 36 and the pressure delivered by the booster pump $P_G$ to obtain said pressure. Consequently, in the state S0', the clutch 32 is at 1 so as to drive the booster pump $P_G$, and the command Z1 is at 1 so as to connect the duct 22 to the duct 36.

The control unit U is connected to the elements 28, 32, Z1, Z2, and Z3 via respective command lines L28, L32, LZ1, LZ2, and LZ3, while it is itself controlled by a command order line LC. When it receives over said line LC the order to pass to assistance mode, the control unit U controls the various members 28, 32, Z1, Z2, and Z3 in such a manner as to execute the sequence for passing the motor to its working configuration.

In the variant of FIG. 2, starting from the free-wheel configuration corresponding to state S0 or S0', the sequence comprises an initialization stage SI. When this stage SI is performed, the service pressure is present inside the case of the motor, said pressure being obtained by turning on the clutch 32 (to activate the booster pump $P_G$) and the command Z1, while the main feed and exhaust ducts 18 and 20 are connected together and isolated from the tank R by turning on command Z2. This puts the main ducts 18 and 20 at a common filling pressure which is lower than the service pressure but higher than the pressure of the fluid return tank. For example, the service pressure may be about 20 bars while the filling pressure may be about 17 bars.

This pressure difference is obtained, for example, by the rated valve 40 situated on the booster connection duct 25 allowing fluid to flow only in the direction going from node N1 towards duct 25. The return spring on this valve is rated, for example, so as to maintain a given pressure difference between the ducts 25 and 36, e.g. a difference of about 3 bars.

After the initialization stage, the sequence comprises a clutching stage at the end of which, in state SE3, the auxiliary duct 22 is in communication with the fluid return tank R, i.e. the command Z1 is at 0 while the main feed and exhaust ducts 18 and 20 are isolated from each other and from the tank R, i.e. the command Z3 is at 1. In addition, in FIG. 2, both clutches 28 and 32 in state SE3 are at 1, which means that the motor M is engaged and is being fed normally by the pump P, with the pump $P_G$ providing boosting.

More precisely, in the first variant as shown in FIG. 2, the clutch engaging stage comprises a first step at the end of which the system is in state SE1 and during which the command Z1 is set to 0 to connect the auxiliary duct 22 to the tank R, while the clutch 32 and the command Z2 remain at 1, the clutch 28 remaining at 0. The clutch engagement stage then has a second step at the end of which state SE2 is obtaining and during which the main ducts are isolated from each other, i.e. the command Z3 goes to 1, while the command Z2 goes to 0, and during which the first drive means remain inactive, i.e. the clutch 28 remains at 0. In this state SE2, the clutch 32 and the command Z1 remain respectively at 1 and at 0.

The clutch engagement stage then has a third step during which the pump P is activated, i.e. the clutch 28 goes to 1, while the commands for the other elements remain unchanged relative to state SE2.

FIG. 3 shows a truth table illustrating another variant in which the clutch engagement stage is slightly different from that of FIG. 2. In FIG. 3, states S'0 and S'0' for the free-wheel configuration are respectively analogous to the states S0 and S0' of FIG. 2. Similarly, state S'I at the end of the initialization stage is analogous to state SI of FIG. 2.

In the variant of FIG. 3, the clutch engagement stage comprises a first step (state S'E1) during which the pump P is activated, i.e. the clutch 28 goes to 1 while the command Z1 remains at 1, i.e. the auxiliary duct 22 remains isolated from the tank R. This, together with the fact that the clutch 32 remains in state 1, makes it possible to maintain the service pressure inside the case of the motor.

In this first step of the clutch engagement stage, the command Z2 remains at 1 so that the main ducts 18 and 20 are in communication with each other. Thus, these ducts remain at the same filling pressure which is lower than the service pressure, but the fact that the pump P is driven makes it possible to maintain fluid flow in the main ducts 18 and 20 in the direction passing through the motor from the feed duct to the exhaust duct. As a result, when the clutch engagement stage is terminated by allowing the pistons to leave their cylinders, this flow generates a supply of fluid that increases the speed at which the pistons pass from their retracted configuration to their extended configuration in contact with the cam.

After this first state S'E1, the clutch engagement stage comprises a second step (state S'E2) during which the command Z1 goes to 0 so as to put the auxiliary duct into communication with the tank R, and during which the command Z3 passes to 1, while the command Z2 passes to 0 so as to isolate the main ducts 18 and 20 from each other. The situation in state S'E2 at the end of this second step corresponds to the situation of state SE3 in FIG. 2. Preferably, these two operations of putting the auxiliary duct into communication with the tank R and isolating the ducts 18 and 20 from each other, take place simultaneously during the second step.

In this second variant, the main pump P is driven by engaging the clutch 28 even before the hydraulic motor M is delivering any driving or braking torque (state S'E1). The clutch 28 can be dimensioned accordingly and can be smaller and less expensive than in the variant of FIG. 2.

The pumps P and $P_G$ are not operated at the same moments in the sequence. As a result these pumps must be driven independently of each other, which means that the clutches 28 and 32 must be capable of being actuated independently, respectively via line L28 and line L32. It might be imagined that the pump P could be driven by an engine specific thereto while the pump $P_G$ could be driven by another specific engine, in which case both engines could be controlled independently of each other. However, it is advantageous for both pumps to be driven using the same engine present on the vehicle for driving the main mechanical transmission.

In the variant of FIG. 2, it is advantageous to use a tank for accumulating fluid under pressure as indicated by reference A in FIG. 1. This tank A can be fed by the booster circuit via a connection duct 27. Thus, when the clutch 32 is engaged, the tank A can accumulate a volume of fluid at the booster pressure. Under such conditions, as soon as the auxiliary duct 22 is connected to the tank R, the volume of fluid contained in the tank A can be made to flow in the ducts 18 and 20 so as to increase the flow rate of fluid in these ducts, thereby giving rise to a corresponding increase in the displacement speed of the pistons for the purpose of putting them into contact with the cam.

The control unit U manages the changeover between the various stages of the sequence and also the durations of these various stages and of the steps therein. The durations of the initialization stage and of the steps during which clutches are engaged can be very short, of the order of a few tenths of a second, and they can be different from one another, so as to ensure that a changeover is not made from one step to the following step until the pressures in the various ducts are appropriate.

For example, in the variant of FIG. 3, changeover to state S'E1 is triggered after a given length of time that makes it possible during state S'I for the ducts 18 and 20 to have been fed sufficiently by the pump $P_G$ to reach the desired filling pressure. Similarly, changeover from state S'E1 to state S'E2 can be triggered after a programmed length of time that enables the drive shaft 26 of the pump P to reach the speed of rotation of the shaft 27, which can be the speed of rotation of the drive shaft of the main transmission, i.e. the speed which corresponds to the speed at which the wheels 10 and 12 are driven.

The apparatus of the invention can be associated with safety means enabling changeover from the free-wheel configuration to the working configuration to take place only when the vehicle is traveling at a speed that is slow enough. For example, by means of the invention, it is possible to place the hydraulic motor in its working configuration when the rotor of said motor is being driven by the wheel to which it is coupled at a speed of about 150 revolutions per minute which, depending on the dimensions of the motor, can correspond to the vehicle traveling at a speed of about 30 kilometers per hour. By way of example, the pump P can be selected so as to be capable of delivering fluid at a working pressure of about 300 bars, while the booster pump $P_G$ can deliver fluid at a pressure of about 20 bars into the duct 24 which, in the duct 25, corresponds for example to a pressure of about 17 bars, given the rated pressure of the valve 40.

Figure 4:
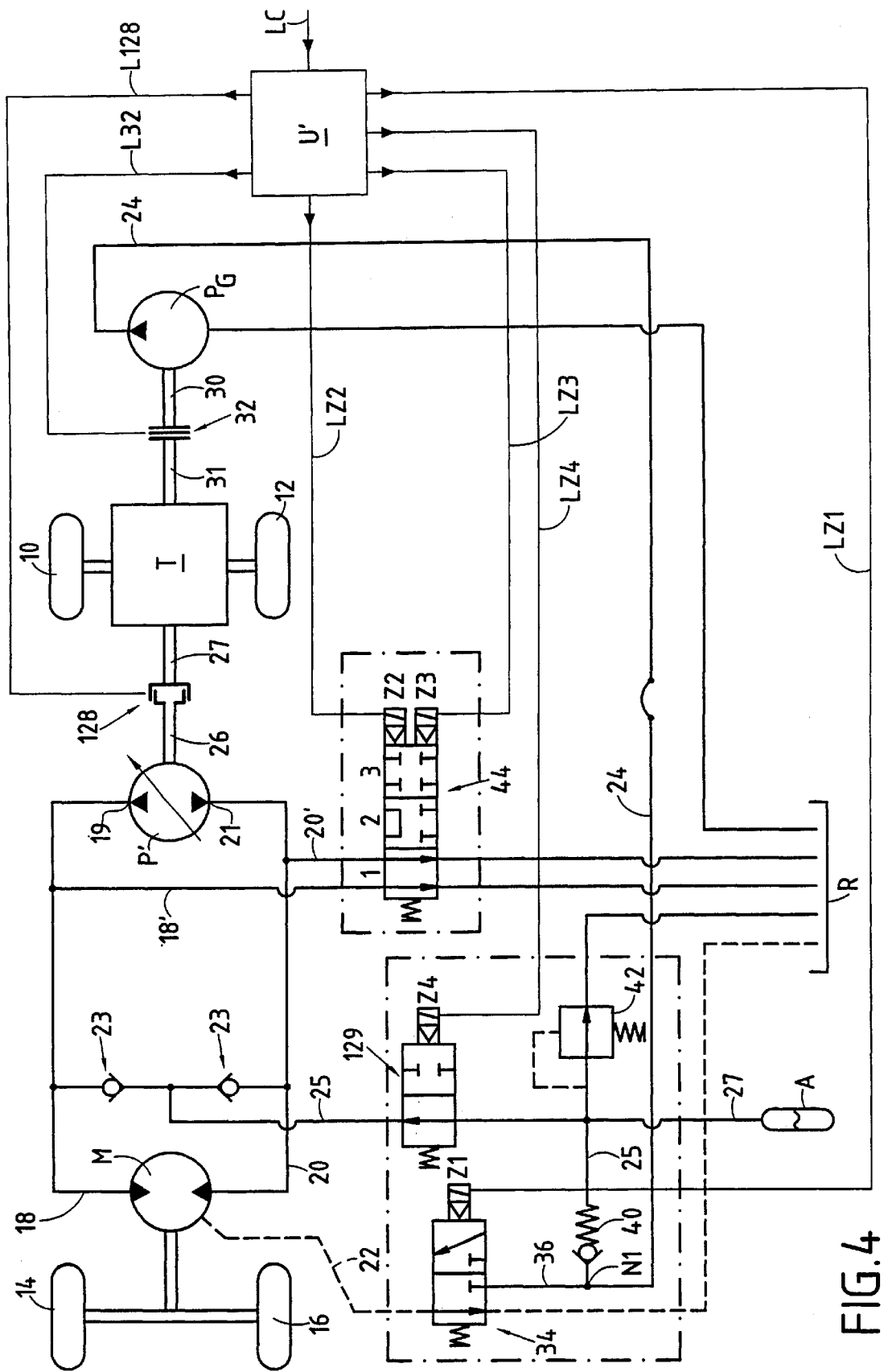
FIG. 4 is a view analogous to FIG. 1 and shows a circuit that is somewhat different.

The diagram of FIG. 4 is analogous to that of FIG. 1 except that the clutch 28 which was a progressive friction type clutch has been replaced by a clutch 128 of the positive type. In addition, the circuit has an additional controlled valve 129 which is placed on the booster connection duct 25, downstream from the rated valve 40. Furthermore, the pump P is replaced by a variable rate pump P'. The control unit U' is analogous to the control unit U of FIG. 1 except that it also controls the command Z4 for the valve 129 via line LZ4.

The use of a positive clutch 128 makes it possible to disengage drive from the main pump P' very quickly when hydraulic assistance ceases to be necessary, and when it is desired to return quickly to drive provided solely by the transmission T.

The valve 129 can occupy a first position, shown in FIG. 4, in which it connects the main ducts 18 and 20 to the booster pump $P_G$, and a second position in which it isolates said ducts from the booster pump $P_G$. The valve 129 is controlled to move between its two positions by the control means Z4, which can be pneumatic, for example.

The control Z4 remains at 0, i.e. the valve 129 occupies its first position, so long as the transmission T is in use on its own while the motor M remains in the free-wheel configuration. Similarly, it remains at 0 during the sequence for changing over from the free-wheel configuration to the working configuration, as shown in FIG. 2 or FIG. 3.

The valve 129 is of use during the stage in which the motor M is deactivated (going from the working configuration to the free-wheel configuration) when it is desired to deactivate hydraulic assistance quickly. Starting from state SE3 or S'E2 as shown in FIGS. 2 or 3, the free-wheel state can be returned to in stable manner, e.g. by going back to state S0 or S'0. Nevertheless, to cause the pistons to return more quickly into their respective cylinders, it is possible, starting from state SE3 or S'E2, to cause the clutch 28 or 128 to go to 0 and to put Z3 at 0 (Z2 remaining at 0), while momentarily placing Z1 at 1 (e.g. for 2 seconds) and while momentarily conserving the clutch 32 at 1 so as to ensure that the space inside the case remains under pressure. During the same lapse of time, Z4 is put at 1 so as to reduce the pressure in the cylinder ducts quickly.

This stage of returning the pistons in accelerated manner is illustrated by row A'cc in the truth table of FIG. 3.

It should be observed that even in the absence of the valve 129, as in FIG. 1, it is possible to accelerate the return movement of the pistons into their cylinder ducts, as shown by row Acc in the truth table of FIG. 2. In this case, starting from state SE3, the clutch 28 is set at 0 and Z3 is likewise set at 0 (Z2 remaining at 0), while Z1 is set at 1 momentarily (e.g. for 2 seconds), and while the clutch 32 is kept at 1 momentarily so that pressure continues inside the case. In this case, the pressure in the cylinder ducts remains the booster pressure during this deactivation stage.

Figure 5:
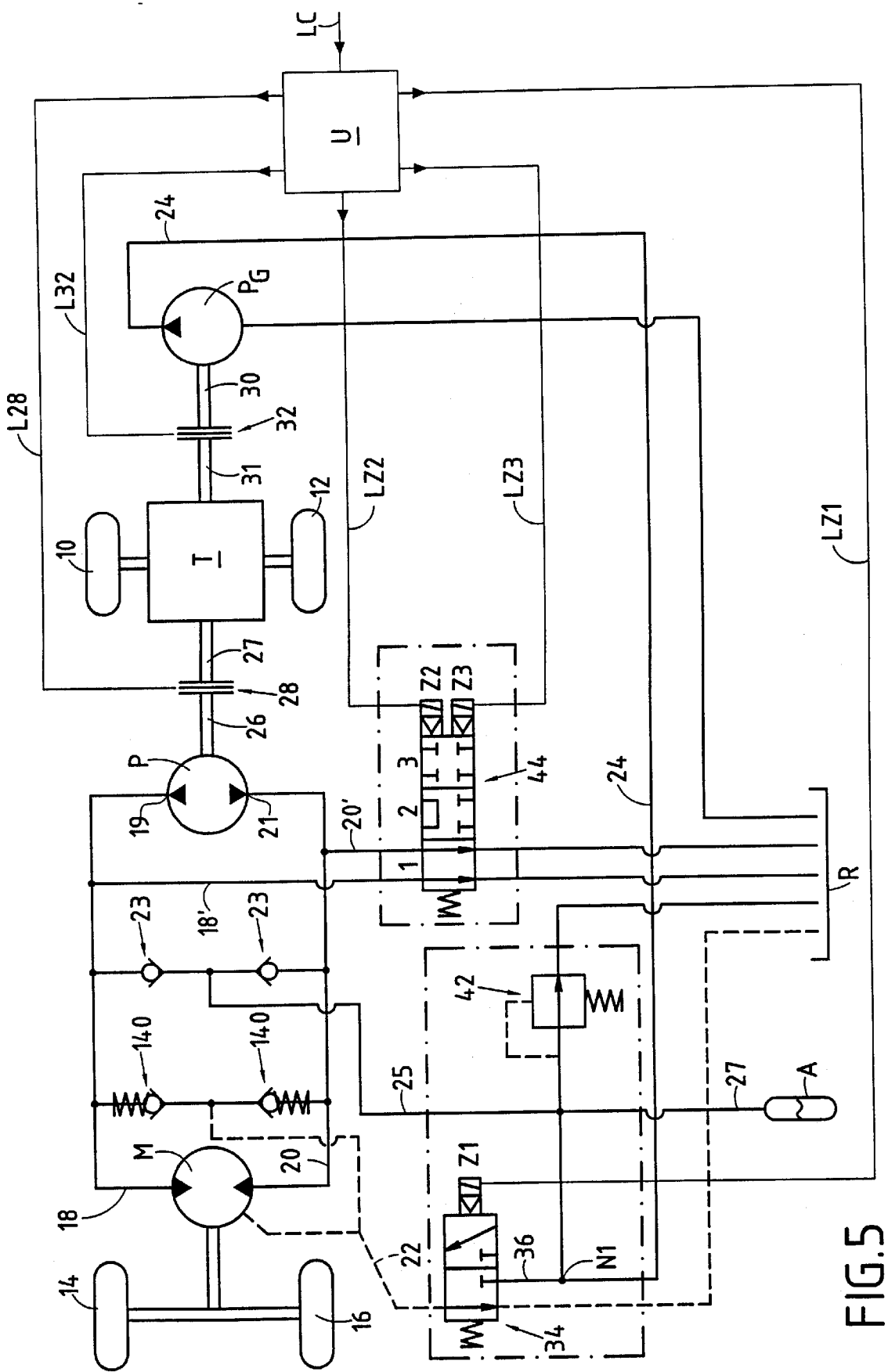
FIG. 5 shows a variant of the FIG. 1 circuit.

FIG. 5 shows a variant which differs from the circuit of FIG. 1 by the position of the means for obtaining the difference between the filling pressure of the ducts 18 and 20 and the service pressure in the duct 36.

These means comprise at least one rated check valve 140 which is analogous to the valve 40 but which is placed between the auxiliary duct 22 and that one of the main ducts 18 and 20 which is at low pressure in the preferred direction of operation (forward direction) of the motor M, said valve 140 allowing fluid to flow only in the direction going from duct 22 towards said main duct.

It is preferable to provide two rated valves 140, placed respectively between the ducts 22 and 18 and between the ducts 22 and 20, said valves performing their function for respective opposite directions of operation of the motor.

Naturally, this variant as shown in FIG. 5 can be transposed to the circuit of FIG. 4.

During the initialization stage, the valve(s) 140 performs the same role as the valve 40 in FIGS. 1 and 4 by maintaining the filling pressure at a value that is lower than the service pressure. Thus, it is possible to use the sequence of FIG. 2 with the circuit of FIG. 5 or the sequence of FIG. 3 with the circuit of FIG. 5 as modified to have the valve 129.

Nevertheless, it is advantageous to select the sequence shown in FIG. 6. In this figure, the states S"0, S"0', S'I, and S"E1 are analogous to the states S'0, S'0', S'I, and S'E1 of FIG. 3, except that the control Z4 is not shown in FIG. 6.

The state S"E1 is followed by a state S"E2 in which the command Z1 remains at the value 1 (the auxiliary duct 22 remains isolated from the tank R), while the commands Z2 and Z3 pass respectively to the values 0 and 1 (the valve 44 passes into its position 3). The main ducts 18 and 20 are then isolated and the pressure in that one of the main ducts which is connected to the delivery from the pump P (e.g. the ducts 18) becomes higher than the service pressure. The pressure in the other main duct which is connected to the delivery from the motor (e.g. 20) thus becomes greater than the service pressure because of the fluid delivered by the motor which is added to the fluid delivered by the booster. As a result, the pistons of the motor whose cylinders are connected to the main duct at high pressure are put into contact with the cam. The fluid overflow from the case corresponding to the outlets from these pistons is then emptied by a valve 140 into that one of the main ducts (e.g. 20) which being connected to the inlet of the pump P is at low pressure. At this moment, the motor M acts as a pump since it feeds the pump P with fluid, which pump is then operating as a motor. This facilitates acceleration of the pump P so that the clutch 28 is subjected to less stress than in the case of FIG. 3.

This state S"E2 is the cause of a sudden increase of pressure in the main duct at high pressure. To avoid an excessive pressure peak in this duct, the state S"E2 is quickly abandoned in favor of the state S"E3 which is identical to the state S"E1. The pressure peak is eliminated by putting the ducts 18 and 20 into communication.

The state S"E4, identical to the state S'E2, is then adopted. Compared with the state S'E2, it has the advantage of being activated while the pistons of the motor are already in contact with the cam. By passing via the states S"E2 and S"E3, it is possible to reduce the stress on the clutch 28.

This sequence can be adapted to a circuit corresponding to that of FIG. 5, modified to include the valve 129. In this case, the command Z4 is set at 1 only during the accelerated return stage of the pistons A"cc which corresponds to the stage A'cc of FIG. 3.

What is claimed is:

1. Drive assistance apparatus for a vehicle having a mechanical main transmission for driving displacement members of the vehicle, the apparatus comprising a main source of fluid under pressure suitable for being driven by first drive means to deliver fluid under pressure, and at least one hydraulic motor suitable for being fed with fluid under pressure by the main source of fluid to drive at least one displacement member of the vehicle, said motor having a stator and a rotor suitable for rotating relative to the stator about an axis of rotation, the motor comprising a cinder block which belongs to a first one of the two elements constituted by the stator and the rotor, which is disposed inside a case, and which presents a plurality of cylinder-and-piston assemblies disposed radially relative to the axis of rotation, together with a reaction member for the pistons which belongs to the second one of said two elements, the motor also having a main fluid feed duct and a main fluid exhaust duct suitable for being put into communication with the cylinders, and an auxiliary duct connected to an internal space provided inside the case around the cylinder block and suitable for being put into communication with a fluid return tank, the motor being suitable for adopting a working configuration in which the pistons co-operate with the reaction member and are suitable for generating outlet torque under the effect of the fluid delivered by the main fluid source, and also a free-wheel configuration in which the pistons are maintained in the retracted position inside their cylinders so that the rotor is free to rotate relative to the stator without generating any outlet torque, the apparatus comprising means for performing the successive stages of a sequence for causing the motor to pass from its free-wheel configuration into its working configuration, said sequence comprising an initialization stage in which the auxiliary duct is isolated from the fluid return tank and is connected to a service duct which is fed with fluid under pressure such that a service fluid pressure exists inside the internal space of the case, and in which the main feed and exhaust ducts are placed at a common filling pressure which is less than the service pressure but greater than the pressure of the fluid return tank, the sequence further comprising, after the initialization stage, a clutch engagement stage during which the auxiliary duct is put into communication with the fluid return tank and during which the main feed and exhaust ducts are isolated from each other.

2. Apparatus according to claim 1, wherein, during the clutch engagement stage, the main ducts are isolated from each other only after the auxiliary duct has been put into communication with the fluid return tank.

3. Apparatus according to claim 2, wherein the clutch engagement stage comprises a first step during which the auxiliary duct is put into communication with the fluid return tank while the main ducts remain at the filling pressure, followed by a second step during which said main ducts are isolated from each other while the first drive means are inactive, and by a third step during which said first drive means are activated so as to drive the main source of fluid under pressure.

4. Apparatus according to claim 2, wherein the clutch engagement stage comprises a first step during which the first drive means are activated so as to drive the main source of fluid under pressure while the auxiliary duct remains isolated from the fluid return tank, followed by a second step during which the auxiliary duct is put into communication with the fluid return tank and during which the main ducts are isolated from each other.

5. Apparatus according to claim 1, wherein the clutch engagement stage comprises a first step during which the first drive means are activated so as to drive the main source of fluid under pressure while the auxiliary duct remains isolated from the fluid return tank, followed by an intermediate step during which the main ducts are momentarily isolated from each other, and then momentarily reconnected to each other, and by a final step during which the auxiliary duct is put into communication with the fluid return tank and during which the main ducts are isolated from each other.

6. Apparatus according to claim 1, wherein the means for performing the successive stages of the sequence for causing the motor to pass from its free-wheel configuration to its working configuration comprise valves controlled by command means themselves under the control of a control unit.

7. Apparatus according to claim 6, wherein the valve control means are pneumatic means.

8. Apparatus according to claim 1, wherein the first drive means comprise a drive shaft suitable for being mechanically linked to the mechanical transmission.

9. Apparatus according to claim 1, wherein the service pressure is delivered by an auxiliary source of fluid under pressure to which the service duct is connected, said auxiliary source of fluid being suitable for being driven by second drive means independently of the main source of fluid under pressure to deliver fluid under pressure.

10. Apparatus according to claim 9, wherein the main ducts are connected to a booster duct itself connected to the auxiliary source of fluid so that the filling pressure is delivered by said auxiliary fluid source.

11. Apparatus according to claim 10, including a rated valve which is disposed on the booster connection duct.

12. Apparatus according to claim 10, including at least one rated valve which is connected between the auxiliary duct and the main duct that is to be found at low pressure.

13. Apparatus according to claim 9, including a pressure limiting valve connected to the booster duct.

14. Apparatus according to claim 1, including a first selector valve suitable for adopting a first position in which it connects the auxiliary duct to the fluid return tank while isolating said auxiliary duct from the service duct, and a second position in which it connects said auxiliary duct to the service duct while isolating said auxiliary duct from the fluid return tank.

15. Apparatus according to claim 1, including a tank for accumulating fluid under pressure and suitable for being connected to the main ducts, at least during the initialization stage.

16. Apparatus according to claim 1, including a second selector valve suitable for adopting a first position in which it connects both main ducts to the fluid return tank, a second position in which it causes the main ducts to communicate with each other while isolating said main ducts from the fluid return tank, and a third position in which it isolates the main ducts from each other and from the fluid return tank.

17. Apparatus according to claim 1, including means for causing the motor to pass from its working configuration to its free-wheel configuration, suitable for implementing a deactivation stage in which the first drive means are inactive, in which the auxiliary duct is isolated from the fluid return tank and is connected to the service duct which is fed with fluid under pressure, and in which the main ducts are put into communication with the fluid return tank.

18. Apparatus according to claim 17, comprising a booster fluid source designed to maintain a booster pressure in the main ducts, the apparatus including a deactivation valve suitable, when the motor passes to its working configuration to its free-wheel configuration, for adopting during the deactivation stage a transient state in which it isolates the main ducts from the booster source.

19. Apparatus according to claim 1, wherein the clutch engagement stage comprises a first step during which the first drive means are activated so as to drive the main source of fluid under pressure while the auxiliary duct remains isolated from the fluid return tank, followed by a second step during which the auxiliary duct is put into communication with the fluid return tank and during which the main ducts are isolated from each other.

* * * * *